United States Patent
Fuhr et al.

(10) Patent No.: US 12,198,219 B1
(45) Date of Patent: Jan. 14, 2025

(54) SYNESTHESIA-BASED ENCRYPTION SYSTEMS

(71) Applicant: UT-Battelle, LLC, Oak Ridge, TN (US)

(72) Inventors: Peter L. Fuhr, Oak Ridge, TN (US); Gary Hahn, Oak Ridge, TN (US); Margaret M. Morganti, Oak Ridge, TN (US); Jason K. Richards, Oak Ridge, TN (US); William H. Monday, Oak Ridge, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 340 days.

(21) Appl. No.: 17/740,921

(22) Filed: May 10, 2022

Related U.S. Application Data

(60) Provisional application No. 63/192,151, filed on May 24, 2021.

(51) Int. Cl.
*G06T 1/00* (2006.01)
*G06T 11/00* (2006.01)

(52) U.S. Cl.
CPC .......... *G06T 1/0021* (2013.01); *G06T 11/001* (2013.01)

(58) Field of Classification Search
CPC ............................ G06T 1/0021; G06T 11/001
See application file for complete search history.

(56) References Cited

U.S. PATENT DOCUMENTS

| | | | |
|---|---|---|---|
| 2007/0180251 A1 | 8/2007 | Carr et al. | |
| 2009/0136087 A1* | 5/2009 | Oren ..................... | G06T 1/0021 382/100 |
| 2014/0297206 A1* | 10/2014 | Silverman ......... | H02J 13/00034 702/58 |

FOREIGN PATENT DOCUMENTS

CN     105306215 A  *  2/2016  ............... H04L 9/32

OTHER PUBLICATIONS

Schneider Electric. (2013). Sepam DNP3 communication for Sepam series 20/40/60/80 User's manual. Andover, MA: Author (64 pages).

* cited by examiner

*Primary Examiner* — David F Dunphy
(74) *Attorney, Agent, or Firm* — LEMPIA SUMMERFIELD KATZ LLC

(57) ABSTRACT

A synesthesia-based encryption system and method (referred to as a system) includes a camera that captures an image and a transceiver communicatively coupled to the camera and a video-only network. The system includes a sensor that monitors a location and generates a sensor message. The sensor message include information that represents a state, a measurement, and/or a detection at that location. The system's processor maps colors to characters from the sensor message to generate a replacement image. In some systems, the sensor is encrypted first. The processor integrates the replacement image within the original image or some or all of the video frames captured by the camera to form a combined image(s) and causes a transceiver to transmit the combined image(s) across the video-only network to a destination.

20 Claims, 15 Drawing Sheets
(7 of 15 Drawing Sheet(s) Filed in Color)

| 000000 | 000033 | 000066 | 000099 | 0000CC | *0000FF* |
|--------|--------|--------|--------|--------|--------|
| 003300 | 003333 | 003366 | 003399 | 0033CC | 0033FF |
| 006600 | 006633 | 006666 | 006699 | 0066CC | 0066FF |
| 009900 | 009933 | 009966 | 009999 | 0099CC | 0099FF |
| 00CC00 | 00CC33 | 00CC66 | 00CC99 | 00CCCC | 00CCFF |
| *00FF00* | 00FF33 | 00FF66 | 00FF99 | 00FFCC | *00FFFF* |
| 330000 | 330033 | 330066 | 330099 | 3300CC | 3300FF |
| 333300 | 333333 | 333366 | 333399 | 3333CC | 3333FF |
| 336600 | 336633 | 336666 | 336699 | 3366CC | 3366FF |
| 339900 | 339933 | 339966 | 339999 | 3399CC | 3399FF |
| 33CC00 | 33CC33 | 33CC66 | 33CC99 | 33CCCC | 33CCFF |
| 33FF00 | 33FF33 | 33FF66 | 33FF99 | 33FFCC | 33FFFF |
| 660000 | 660033 | 660066 | 660099 | 6600CC | 6600FF |
| 663300 | 663333 | 663366 | 663399 | 6633CC | 6633FF |
| 666600 | 666633 | 666666 | 666699 | 6666CC | 6666FF |
| 669900 | 669933 | 669966 | 669999 | 6699CC | 6699FF |
| 66CC00 | 66CC33 | 66CC66 | 66CC99 | 66CCCC | 66CCFF |
| 66FF00 | 66FF33 | 66FF66 | 66FF99 | 66FFCC | 66FFFF |
| 990000 | 990033 | 990066 | 990099 | 9900CC | 9900FF |
| 993300 | 993333 | 993366 | 993399 | 9933CC | 9933FF |
| 996600 | 996633 | 996666 | 996699 | 9966CC | 9966FF |
| 999900 | 999933 | 999966 | 999999 | 9999CC | 9999FF |
| 99CC00 | 99CC33 | 99CC66 | 99CC99 | 99CCCC | 99CCFF |
| 99FF00 | 99FF33 | 99FF66 | 99FF99 | 99FFCC | 99FFFF |
| CC0000 | CC0033 | CC0066 | CC0099 | CC00CC | CC00FF |
| CC3300 | CC3333 | CC3366 | CC3399 | CC33CC | CC33FF |
| CC6600 | CC6633 | CC6666 | CC6699 | CC66CC | CC66FF |
| CC9900 | CC9933 | CC9966 | CC9999 | CC99CC | CC99FF |
| CCCC00 | CCCC33 | CCCC66 | CCCC99 | CCCCCC | CCCCFF |
| CCFF00 | CCFF33 | CCFF66 | CCFF99 | CCFFCC | CCFFFF |
| *FF0000* | FF0033 | FF0066 | FF0099 | FF00CC | *FF00FF* |
| FF3300 | FF3333 | FF3366 | FF3399 | FF33CC | FF33FF |
| FF6600 | FF6633 | FF6666 | FF6699 | FF66CC | FF66FF |
| FF9900 | FF9933 | FF9966 | FF9999 | FF99CC | FF99FF |
| FFCC00 | FFCC33 | FFCC66 | FFCC99 | FFCCCC | FFCCFF |
| *FFFF00* | FFFF33 | FFFF66 | FFFF99 | FFFFCC | FFFFFF |

FIGURE 3

```
colors_map_1.json

{
" ": "#c53925",
"!": "#98bb0c",
"\"": "#8937d0",
"#": "#1e65a4",
"$": "#85884c",
"%": "#3c035e",
"&": "#bfe47e",
"'": "#d6aa94",
"(": "#a58a16",
")": "#eb87a1",
"*": "#f2c445",
"+": "#c55043",
",": "#ee2593",
"-": "#d69632",
".": "#81e3a5",
"/": "#65e70b",
"0": "#9704c4",
"1": "#433538",
"2": "#d19fbc",
"3": "#0eeef9",
"4": "#10dc69",
"5": "#401e2d",
"6": "#d383da",
"7": "#6683ff",
"8": "#90bc24",
"9": "#296703",
":": "#d05d2d",
";": "#f7caf9",
"<": "#49dc77",
```

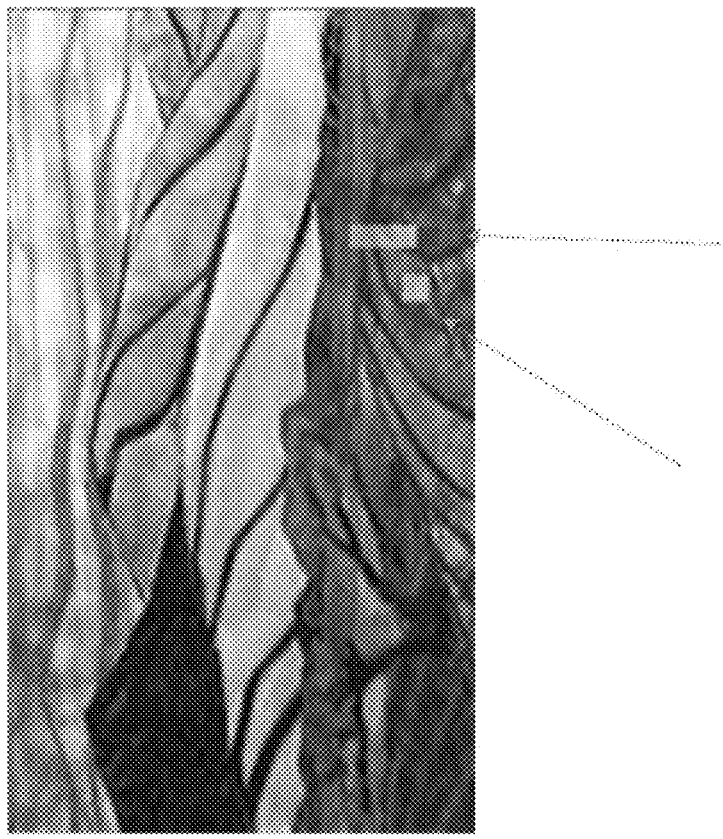
FIGURE 14

SYNESTHESIA-BASED ENCRYPTION SYSTEMS

PRIORITY CLAIM

This application claims priority to U.S. Provisional Patent Application No. 63/192,151, titled "Synesthesia-Based Steganographic Encryption for Automation Systems" which was filed on May 24, 2021, which is herein incorporated by reference.

STATEMENT REGARDING FEDERALLY SPONSORED RESEARCH AND DEVELOPMENT

These inventions were made with United States government support under Contract No. DE-AC05-00OR22725 awarded by the United States Department of Energy. The United States government has certain rights in the inventions.

TECHNICAL FIELD

This disclosure relates to security and more specifically to keeping data and messages secure.

RELATED ART

There are many ways to keep messages secure. Some prevent casual observers from reading messages and others prevent cryptanalysis from reading them. If the messages are locked up in an isolated computer hidden within a national laboratory, the messages are likely inaccessible, but not necessarily secure. An isolated location does not necessarily eliminate the risk of messages being intercepted or read by unauthorized intruders.

Some claim the privacy of their algorithms ensures their messages are secure. Yet, history has shown that with enough time and resources such algorithms can be broken and reversed engineered. In the late nineteen thirties and during World War II, for example, the Japanese communicated in PURPLE in which messages were translated from hieroglyphic characters to their phonetic equivalents in the Roman alphabet before being encoded by an electric machine. Before the war began, the US army not only broke the code but reversed engineered the electric coding machine. It was such a success that the decryption occurred with such speed and accuracy that diplomatic messages were read by the US army before Japan's diplomats.

Many algorithms claim to be unconditionally secure. These claims are generally unsupported because most systems are susceptible to attacks that apply a range of decoding resources against a single encryption. What hasn't been achieved is a computationally secure system that is impractical to break with available resources.

DESCRIPTION OF THE DRAWINGS

The system may be better understood with reference to the following drawings and description. The components in the figures are not necessarily to scale, emphasis instead being placed upon illustrating the principles of the invention. Moreover, in the figures, like-referenced numerals designate corresponding parts throughout the different views. The patent or application file also contains at least one drawing executed in color. Copies of this patent or patent application publication with color drawing(s) will be provided by the Office upon request and payment of the necessary fee.

FIG. 3 is an exemplary translation table processed by a color cipher

FIG. 5 is another exemplary color map that associates randomly selected colors with a character.

FIG. 6 is an exemplary color block conversion map used by the color cipher.

FIG. 14 are exemplary modified/combined static images.

DETAILED DESCRIPTION

Figure 1:
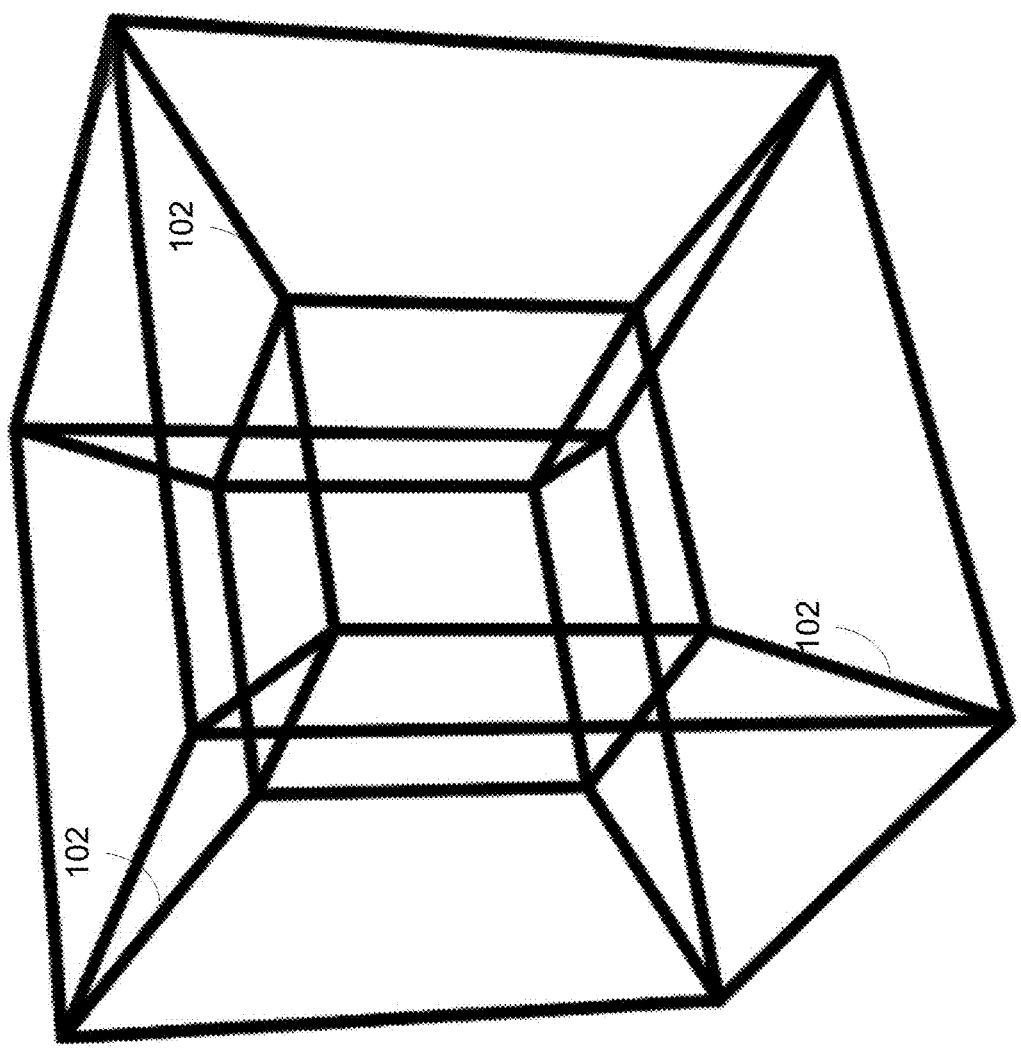
FIG. 1 is a four dimensional partially rotated view of a cube enclosed in another cube.

Synesthesia-based encryption systems and processes (e.g., referred to as a system(s) or an apparatus or protocol(s)) provides nearly risk-free communication, data security, and file security. By automating the generation, distribution, storage, and channeling of messages, and dynamically changing the schemes that conceal those messages, the protocol provides secure sensor-to-sensor, sensor-to-server, and sensor-to-server communication, and secure communications between transmitters and receivers. Each sensor or transducer that communicates through a network includes a tamper resistant cipher that executes dynamic and/or static encryption. A color cipher conceals the encryption with each message transfer and/or at each synchronized transmitting time period (e.g., such as about every one-third of a second). Besides dynamically encoding messages to prevent unauthorized access, the systems dynamically hide the encrypted messages in other media. The constantly mutating and changing processes make cryptanalysis impractical and the system computationally secure.

The moving target defense of the synesthesia-based encryption systems provide limited exposure against cryptographic attacks including brute-force attacks, man-in-the-middle attacks, replay attacks, side-channel attacks, power analysis attacks, and timing attacks, for example. A brute-force attack is a simple attack with each possible secret key that checks the result of each decryption to determine if the messages are decrypted. A man-in-the-middle attack inserts an attacker in the communication channel between the parties that reads the messages that are exchanged between them. A replay attack occurs when an attacker replays a valid communication session between legitimate users to sustain a valid session and masquerade as an intended recipient. Side-channel attacks monitor the power used in cryptographic operations to glean information about the plaintext and/or secret keys that are processed. Similarly, a power-analysis attack processes the power traces of an Rivest-Shamir-Adleman (RSA) encryption to decrypt secret keys. A timing attack monitors the execution times of a target to identify plaintext or secret key processing times because many algorithms take different amounts of time to decipher different plaintexts or secret keys. Despite so many strategies, the attacks are less effective against the disclosed synesthesia-based encryption protocols because the potential breach of the disclosed protocols unlocks only a single data transaction (also referred to as a message transaction), as the next data transaction or message sent is encrypted by a different or changing encryption process and is obscured by a different or changing concealing process. The term message refers to a unit of information transmitted from one device to another. Some messages contain variable blocks of data others just a character or object (e.g., usually characters encoded according to the American Standard Code for Information Interchange II (ASCII) standard). Some alternative messages include a beginning and an ending character, control characters, a software-generated header (e.g., a destination address), error checking information, and/or synchronizing information.

In the disclosed synesthesia-based encryption system, the concealing process hides the secret data in other media, such that the data's very existence is hidden. In use, a device detects or measures somethings like a physical property, for example, by converting nonelectrical energy into electrical signals that it wishes to keep secret. The output is then enciphered, concealed, and transmitted to a destination during a session. A session comprises a series of requests and responses that perform a complete task or set of tasks between a receiving device, such as a client, and a sending device such as a monitoring device or sensor, for example. In some systems, the enciphered signals hide secrets through a translation into graphic image replacement data stored in a graphic image file that renders a replacement image such as bitmapped graphic replacement image when rendered on an output device such as a display or a printer. The bitmapped graphic replacement image replaces portions of the graphics interchange formats that convey images and standard video formats that convey video frames. Some systems obfuscate secrets by placing the replacement image within a visible yet obfuscated vector that is part of the modified image (also referred to as a combined image, a heads-up combined image, etc.) having a starting point and an end-point or anchors. The endpoints can be identified by x-y-coordinates in two dimensional space, in x-y-z-coordinates in three dimensional space in alternate systems, and x-y-z-w-coordinates in four dimensional space in other alternate systems. The w coordinate in the four dimensional space captures an "unseen" dimension of an object that is only "seen" upon a rotation. For example, the w coordinate may capture the eight lines connecting corresponding vertices of two cubes, for example, in which two three-dimensional cubes are drawn in two dimensional space in which one cube encompasses the other, and are separated by a partially "unseen" distance in two dimensions that contains the obfuscated lines 102 (that can hold some or all of the replacement image(s)) drawn between their corresponding vertices that become seen when the object is rotated as shown by the offset cubes drawn in FIG. 1. In some systems, one or more replacement images that are part of the combined image comprise the lines that join the vertices 102.

The systems may overlay, embed, append and/or integrate (referred to as combine(d) or combining) replacement images that represent a secret. The secret may be measurement(s) or secret detection(s) of something such as a physically sensed property. It may be measured by a sensor (e.g., that measures a physical pressure, a temperature, a humidity, sunlight, and/or that executes a vision detection, an auditory detection, an olfactory detection, a gustatory detection, a tactile detection, a balance detection, and/or proprioception detections, etc.) and combined with one or more static images and/or video frames conveyed by one or more video cameras in real-time or faster than real-time. The systems combine image data that can be converted into an information image(s), replacement image(s), or intermediate image(s) (referred to as replacement image(s)) into the one or more images that comprise a picture and/or video frames that comprise videos. In some applications, portions of the replacement image data replace and/or transpose the least significant bit of each byte of the data structure that makes up the original image(s) or video frames with one or more substitute bits taken from the data file that renders the replacement image until all the substitute bits are processed. The original graphical image and/or video frames do not appreciably change as current graphic standards include more color graduations than the human eye can detect and most cryptoanalysis monitor. In some systems, the enciphered message is also secretly embedded within the image file using metadata fields in addition to overlaying the replacement image. These systems facilitate efficient deciphering by the client when receiving images as discrete files.

The modifications made by combining and/or substituting portions of the replacement images with portions of the original images and/or some or all portions of the video frames that are tracked in some systems so that the statistical profile of the modified image and/or modified real-time video frames of the byte sequence and/or byte strings are substantially the same as or identical to the original image and/or unmodified video frames. Consistent or substantially identical statistical profiles are maintained through compensatory bit manipulations or bit mutations of other lesser significant bits in the modified image by processors in some alternate systems to minimize byte-sequence or string divergence distance measurements in predetermined byte-sequences, etc. (e.g., the statistical measures that detect byte-sequences or string modifications in data that identify modified and/or pirated images). In some systems, the divergence is limited to about five to about ten percent. In some use cases, the replacement images are contained within a vector disposed between two endpoints or anchors, allowing the replacement image to be stripped out of the modified image and deciphered when authorized.

As used in this disclosure, the term sequence refers to an ordered arrangement of objects, as in a set of sequential numbers or a set of number in an infinite series that adhere to a function such as when each successive integer of a series is a sum of the two integers that precede it. In some systems, the sequence is generated by a linear feedback shift register that executes an Exclusive-OR (EXOR) function of certain bits in a register where the bits comprise a tap function, and in other systems, through additive generators that produce random words rather than random bits. A protocol refers to a series of steps, involving two or more locations designed to conceal a secret. A series of steps means that the steps have a beginning and an end. Every step must be executed in turn, and no step can precede before the previous step has been completed. Involving two or more locations means that at least two discrete physical locations are required to complete the protocol, one location being remote from the other. One location can complete a series of steps to hide a secret, but this is not a protocol (it must be sent to another physical location). Designed to conceal a secret means that the purpose of the protocol is intended to prevent unauthorized access to the secret.

Some synesthesia-based encryption system use tamper resistant ciphers to protect the confidentiality of the data transmitted between the sensors/transcoders/etc. (the device that detect and/or measures and/or convert something) and the intended network resources by enciphering and deciphering the generated output and/or other data. Through these devices and network resources communicating with them, encryption and decryption takes place within tamper resistant cipher facilities. In some systems, the seeds used to generate the encryption keys are generated and stored in the tamper resistant cipher facility and cannot be used for further encryption once they are stored. In these systems, once keys are tagged by a designated use they cannot be used for another purpose. In an exemplary application, each cryptographic key has an associated control vector associated with and locked to it that defines the permitted uses of the key within the system. At an exemplary key generation, the control vector is cryptographically coupled to an encrypting or secret key K through an encryption with a variant of the key encrypting key (e.g., such as an EXOR product of the encrypting key EK and a control vector C) to prevent information from being shared. As part of the decryption process, the cryptographic hardware verifies that the requested use of the key is authorized by the control vector by producing the same variant (e.g., EXOR product of the encrypting key EK and control vector C) that is then used to decrypt the encrypted key EK. Since the encrypting key uses the secret key, the disclosed encryption only occurs in the tamper resistant cipher facilities. In some applications, the control vectors Cs are predefined, and in others, randomly generated and associated with a use. An exemplary table of predefined hexadecimal control vector values that may be used in an electric utility or a utility substation may include:

| Key Type | Exemplary Control Vectors |
| --- | --- |
| Temperature sensors | 00 02 71 00 03 00 00 00 |
| Pressure sensors | 00 02 71 00 03 51 00 00 |
| Phase measurement units | 00 5F 71 00 03 00 00 00 |
| Fault circuit indicators | 00 5F 71 00 03 51 00 00 |
| Frequency disturbance indicators | 00 5F 71 00 03 61 00 00 |
| ... | ... |

In use, the control vectors not only improve data security, but also secretly identify the source of the secret. As shown in the exemplary table, the exemplary control vectors identify the monitors generating the secret.

In some applications, the tamper resistant cipher facilities provide two types of cryptographic sessions that are either automatically selected or manually elected. In an automatic selected session, tamper resistant cipher facilities determine which data is enciphered before it is further encoded by a color cipher near the end of each session. The selection is based on the cryptographic capability of the session recipient, the expected value of the data, and the recipient's access to cryptographic processes and/or services, etc. This may be confirmed by an exchange of messages during an initialization exchange between the sending and receiving destinations. In an elected or nonautomatic session, all outbound data responses are enciphered and all inbound data requests are deciphered. Because some tamper resistant cipher facilities use dynamic cryptographic keys, the tamper resistant cipher facilities can define alternating secret keys and corresponding public keys in a public key infrastructure (PKI) and/or switch between cryptographic protocols and cryptographic algorithms that include block ciphers, combined blocked ciphers, pseud-random sequence generators, and stream ciphers, and real random-sequence generators.

Figure 2:
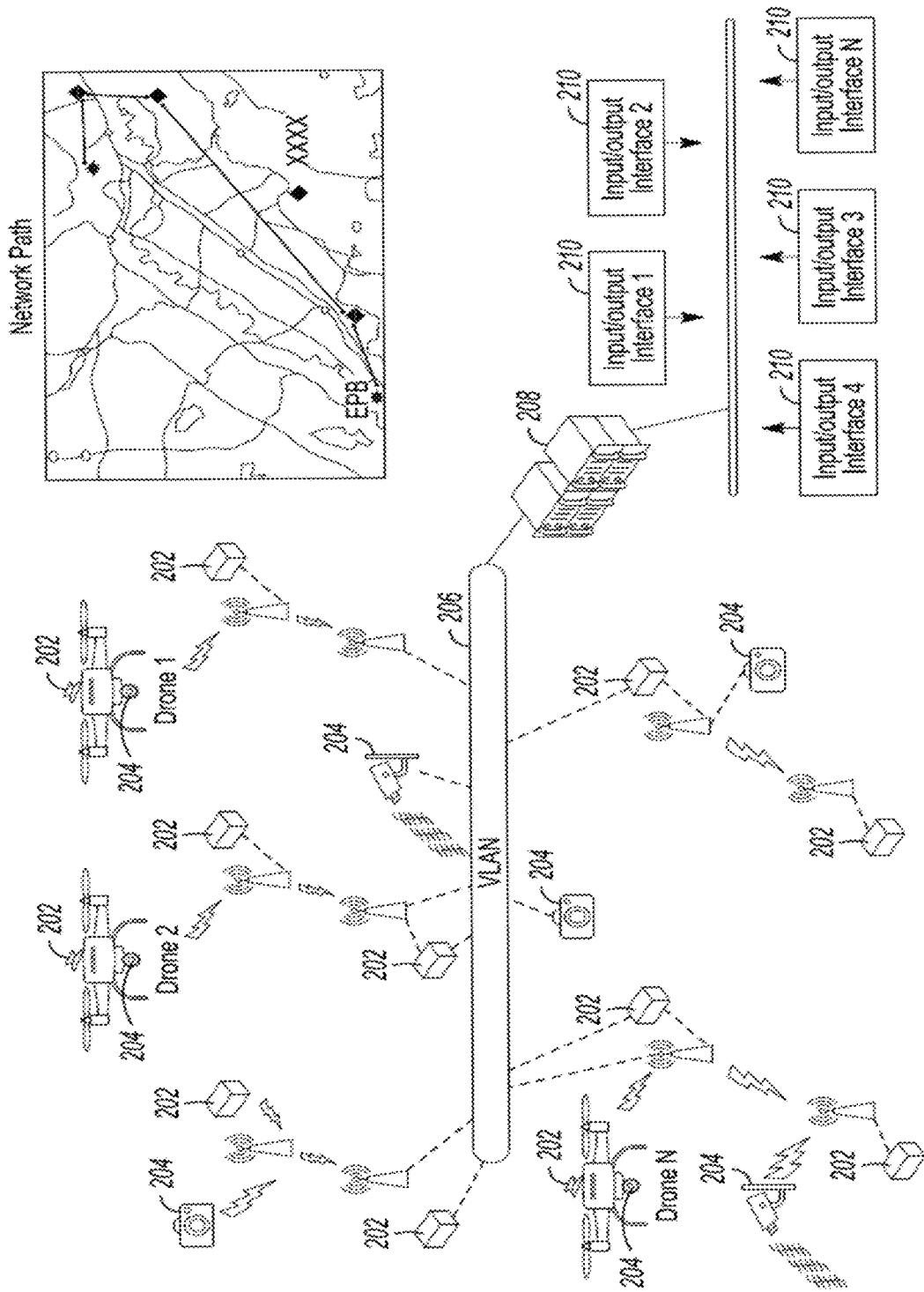
FIG. 2 is a layout of a fiber optic system and an exemplary aerial map of a network.

FIG. 2 shows a computer architecture and an aerial map of a fiber optic communication network. The system of FIG. 2 serves an electric utility that has multiple land and/or air wireless and/or wired monitors 202, wireless and/or wired transceivers, and wireless and/or wired cameras (that include video cameras) 204 that are part of a utilities control center known as a central station and/or the utilities' substations. The land and air supported monitors 202. The monitors include sensors that convert some measurable quantity, such as temperature, for example, into a voltage signal that behaves in a manner analogous to physical changes. Some sensors can detect the presence and concentration of various hazardous gases and vapors, such as toxic or explosive gases, volatile organic compounds (VOCs), hydrogen, etc., and some detect environmental conditions such humidity, expected and other unexpected odors, etc. Some sensors are passive whereas others are active and require power to operate. Some sensors have non-ideal operating behaviors that require compensation, automatic operating calibrations, and real-time corrections and some are integrated with or are a unitary part of a transceiver and/or a camera 204. Other monitors 202 include transducers, smart sensors, phase measurement units, meters, fault circuit indicators, and frequency disturbance indicators.

A transducer is device that converts one form of energy to another. In some applications it is a device that converts some form of energy into an electrical signal or vice versa. It does not include sensors and control devices. Smart transducers and sensors are devices combined with analog-to-digital circuitry, a local computation capability (e.g., a microprocessor or microcontroller), a volatile and non-volatile memory-some of which execute instructions to carry out the functions of the sensor's intended function, one or more transceivers, a global positioning circuit (e.g., that report location and/or synchronized communication) and one or more communication interface. Phase measurement units (PMUs) are devices that measure and transmit current and voltage phasors that are acquired in a time-synchronized cycle across a wide geographic area. Synchronization often occurs through Global Positioning Sensor (GPS) timing sequences or pulses that enable the PMU to stream its output data like a video. While used in transmission systems, PMU's are also used at in electrical distribution systems (e.g., systems that distribute voltage and/or current and/or power). A meter refers to devices that measures current flow and voltage levels over time and transmit energy usages to destinations like a controller in control facilities. Fault circuit indicators are sensing devices that detect the passage of a fault current and provide event notifications or actuate status flags read by a controller in a control facility. A frequency disturbance recorder is a device that monitors alternating current (AC) line frequency, usually at a power outlet. System frequency is an indicator of a utility system's stability.

Alternatives of each of the monitors 202 described herein are smart devices (also referred to as smart monitors) that execute the functions described herein and more functions in other applications. Some smart devices and the tamper resistant cipher facilities (also referred to as tamper resistant cipher devices) separately include analog-to-digital circuitry, a local computation capability (e.g., a microprocessor or microcontroller), a volatile and non-volatile non-transitory memory-some of which may execute instructions to carry out the functions of the monitor, one or more transceivers, a global positioning system circuit (to report location) and one or more communication interfaces that are a unitary part of the devices like the smart sensor. In some systems, the smart devices/monitors 202 couple, communicate with, or include the tamper resistant decipher facilities (e.g., that are a unitary part of the monitors 202 and/or include cameras and video cameras collectively shown as 204 in FIG. 2). The tamper resistant decipher facilities and some monitoring devices include a microarchitecture running four or more core processors running at high processing speeds such as at or between about 1.5 Gigahertz (GHz) and 1.8 GHz with an optional integrated active and/or passive thermal cooling systems. Some core processors are full-speed cores, others are lower-performing efficiency-boosting cores that execute background tasks, and/or service specialized and peripheral accelerators. Some devices run a dynamic execution cycle that executes instructions in an order governed by the availability of input data and/or an assigned execution priority of the task and/or processing step rather than the original order established by the program. Execution priority is pre-assigned in some devices by the monitor it is servicing and/or dynamically assigned in alternative systems based on the processors' empirical observation of the processor's prior execution cycle(s) by an observation program that tracks processing time, wait states, and/or bottleneck notifications received from transmitting sources via the processor's scheduler. The out-of-sequence execution allows the core processors to avoid idle times caused by waiting for the preceding instruction to be completed and process the next instructions that are able to run immediately and independently to achieve a fast-than-real-time processing. The sequence occurs when the processor preemptively switches to processing a next instruction, when a condition that is based on time, wait states, or other factors is detected.

The smart devices and the tamper resistant cipher's processors are supplemented by a random access memory or non-transferable media, such as between 8 Gigabyte (GB)-16 GB, for example, and some include Peripheral Component Interconnect Express (PCIe) interfaces that support a variety of peripherals including graphic processing units (GPUs, e.g., to support video cards and/or graphics cards), a redundant array of independent disks (e.g., storage virtualization technology that lumps physical disk drives and/or solid state drive (SSDs) that provide drive data redundancy and/or improve storage efficiency), Wireless Fidelity (Wi-Fi) cards, and/or SSDs add-on cards. Further, some systems include a native Power over Ethernet (POE) interface. The integration of PoE of these smart devices simplify cabling for the networked applications.

In FIG. 2, the geographically dispersed monitors 202 communicate across a fiber optic network 206 that enables authorized devices to interact with another. In some applications, the communication behind the security system protects the network again external threats such as hackers coming from another network like the Internet. The firewalls 208 shown in FIG. 2, prevent computers in the authorized network from directly communicating with computers external to the network and vice versa. Instead, all external communication is routed through a proxy server or proxy cluster outside of the organization's network, and the proxy server or proxy cluster decide whether it is safe to allow a message to pass through to the network. In FIG. 2, the network comprises access points, switches, routers, and other components that enable devices to connect to internal servers, web servers through the proxy servers and/or proxy clusters, and other local networks via wide area networks that connect geographically separated areas as shown in the map that also may include connection points thorough input/output interfaces 210 and transceivers. In FIG. 2, the network is a peer-to-peer network without a central server, where each monitor 202 can share equally in the functioning of the network and some or all the monitors 202 communicate across other networks including those that exclusively convey video (e.g., through streaming) or convey only video signals (video only networks) to isolate the image and frame data from other data. Video streaming is the continuous transmission of a video file from a source to a destination without having to download the content. In alternative systems, streaming transmissions include audio files. In some systems, the network includes several devices and monitors 202 or other clients connected to a central server that manages file storage, application access, device/monitor access, and network traffic. A client is a connected device that runs or accesses applications. The clients connect to the server through physical or wireless connections much like the monitors communicate with one another in the peer-to-peer network.

Figure 4:
FIG. 4 is an exemplary encryption and encoding of a plaintext input "My Secrets".
Figure 6:
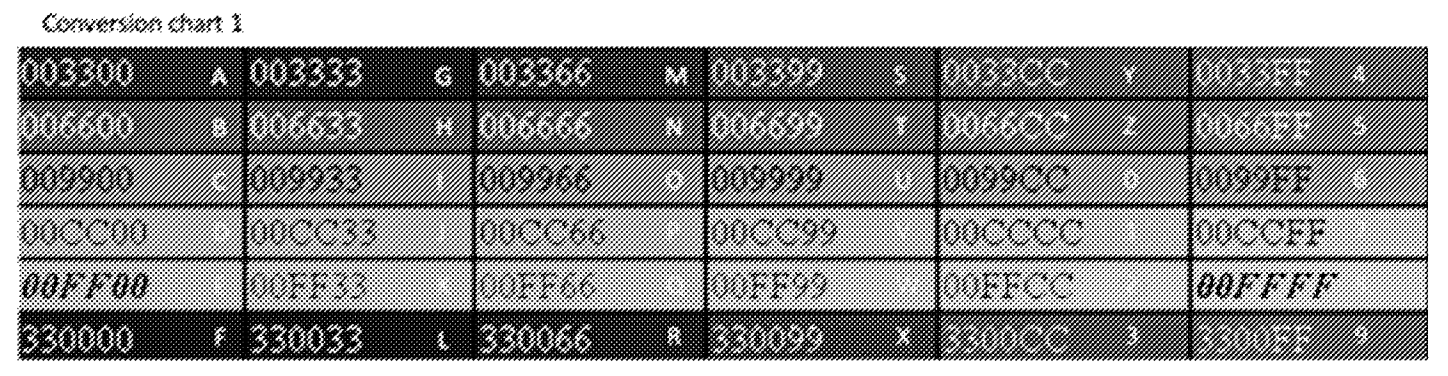

FIG. 3 is a translation table used by a color cipher; the color cipher encrypts an input with one or more colors. The algorithms combine the techniques of diffusion, confusion, and permutations. In FIG. 4, the plaintext input "My Secrets" is encrypted by the tamper resistant cipher through a cryptographic protocol such as a static and/or a dynamic symmetric PKI cryptography process to render the "3qSip-iUde" encryption string. The exemplary symmetric process encrypts each sensor's output data or message transaction with a separate static and/or dynamic key. The key is a session key because it is used in one sensor data/message transaction and is only valid for the duration of the that sensor's transmission. Once encrypted, each character of the encrypted string is encoded into a block of color by the color cipher (the output shown as the block color string in FIG. 4). Every character or object is substituted with a different color block with an exemplary color map similar to the one shown in FIG. 5 and representative conversion blocks shown in FIG. 6. An inverse process (referred to as a reverse mapping) produces the encryption string from the color string at the receiver side using the same conversion blocks that encoded them. The character-to-color associations shown in FIGS. 3, 5, and 6 change randomly in other alternate systems. In some alternate applications, it changes with each sensor output or message transaction.

In some systems, the selection of a color map(s) to encrypt secrets is initially determined by a pseudo-random sequence generator. An exemplary pseudo-random sequence generator may take the form:

$$X_n = (aX_{n-1} + b) \bmod m \quad (1)$$

in which $X_n$ is the nth number of the sequence, $X_{n-1}$, is the previous number in the sequence and a, b, and m are constants with a being the multiplier, b is the increment and preferably relatively prime of m, and m is the modulus. The random sequence seed value is the value of $X_0$. With the color block sizes predefined in some systems and variable in other systems. All of the characters of the encrypted text are then converted into blocks of color selected from the color palettes and corresponding designations (shown in the color maps) to form the replacement image and corresponding data (referred to as replacement data or replacement image data) that renders the replacement image. The replacement image replaces, modifies, or overlay portions of the original static image(s) or video frames including real-time images and/or video frames.

In some applications the replacement image comprises multiple replacement images having different orientations. Some replacement images are positioned in a vector compressed into a single pixel and is substituted for the original pixel value. In some systems, replacement images are positioned within a vector conveyed by a strip overlaying an image and/or frame, some are positioned within a spiral (or substantially spiral-like shape) segment that is integrated into the image and/or frame, some are positioned within a cardioid (or substantially cardioid-like shape) segment within or overlaying an image or frame, some are positioned within a catenary (or substantially catenary-like shape) segment within or overlaying an image or frame, and some are positioned within a line (or substantially linear shape) segment within or overlaying an image or frame. The placement of the replacement image in the modified image is randomly designated based on a pseudo-random-sequence generator or a sequence, generated by the pseudo-random-sequence generator or a sequence described herein.

The term real-time (and real-time) is intended to broadly encompass systems that process information at the same rate the systems receives data through the network, enabling some of them to direct or control a process such as one or more automation systems the monitor track and/or surveillance cameras that convey signals. In some applications the cameras 204 are linked to remote or local areas through Internet Protocol (IP) addresses, for example.

In another alternative system, the color cipher's block size output and the transmission channel that conveys the modified images and/or video frames are used as the seed value to generate the symmetric keys that decrypt and identifies the color scheme used by the color cipher. In these alternative exemplary systems, data and/or messages are protected by a tripart encryption scheme protocol made first by the tamper resistant cipher facilities, which is then enciphered by the color cipher, which is then enciphered by the tamper resistant cipher facilities based on an alternative key. This exemplary alternative system key can be formed by the block size output transmitted by the color cipher and the tamper resistant cipher's network selection.

Figure 7:
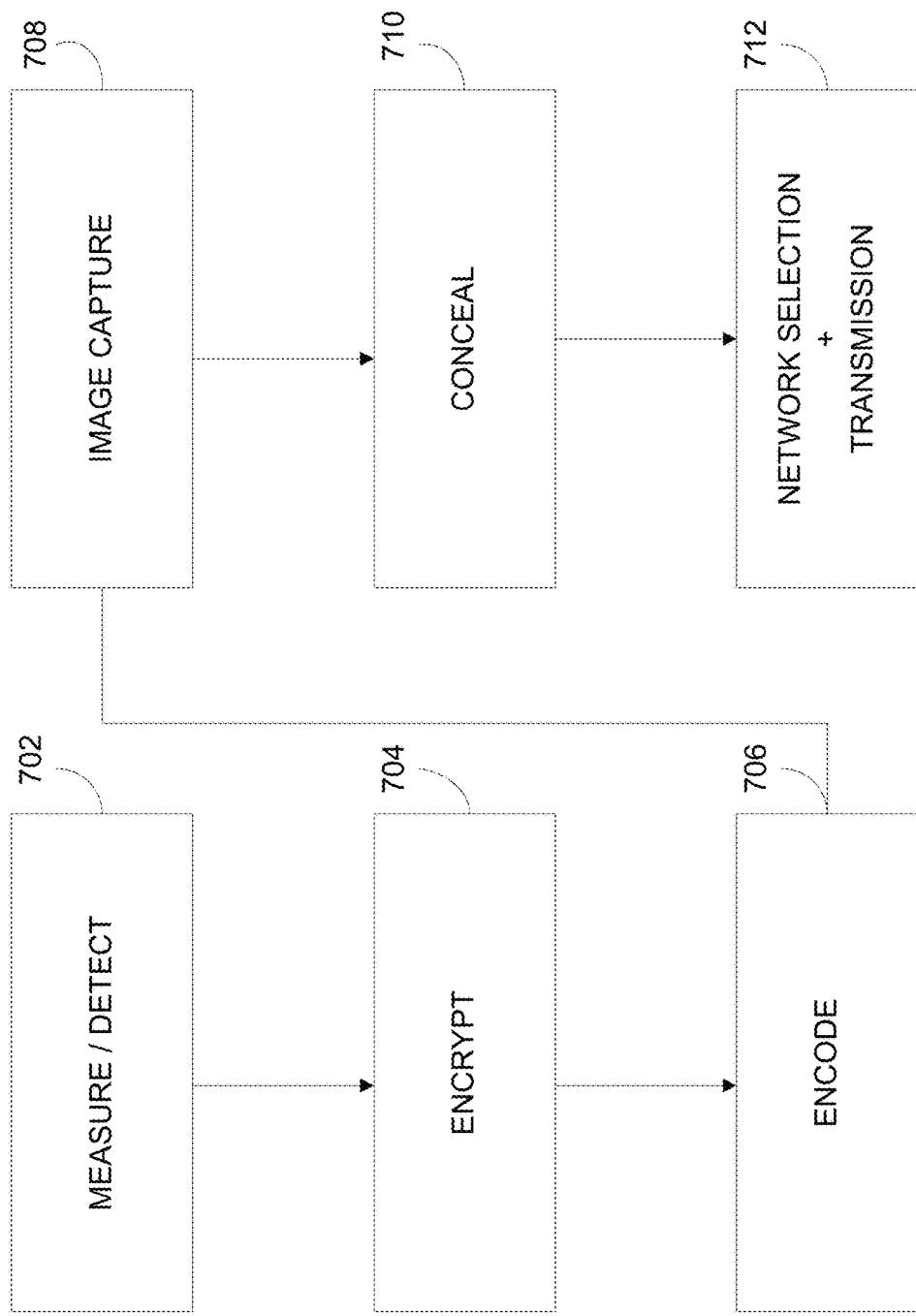
FIG. 7 is an exemplary process flow of a synesthesia-based enciphering process.

FIG. 7 is a process flow of a synesthesia-based encryption process. A device measures something and/or detects something such as mechanical energy (e.g., pressure) event, voltage, current, chemical detections, heat, light, or sound, at 702. The output is enciphered into ciphertext through a block, stream, combined block, pseudo-random-sequence stream and/or a symmetric public key infrastructure cipher through the tamper resistant cipher facilities at 704. Once encrypted, each character of the encrypted output is further encrypted into a block of color bytes by the color cipher at 706 that occurs within the tamper resistant cipher facilities in some processes and is remote from the tamper resistant cipher in other processes. The enciphered signals are translated into data stored in a graphic image file that renders one or more replacement images (also referred to as an information images) having common or different orientations such as bitmapped graphic replacement image. In FIG. 7, the replacement image data is stored in a portable network graphics format. A joint photographic expert group format that stores images in a compressed form using a discrete cosine function is used in other processes, and other formats are used in other processes. Some formats trade higher image or video compressions for lower image or frame resolutions and vice-versa. In some processes, the selected format replaces the graphics interchange format and other standard formats used to transmit images (and video frames).

At 708 an image capture device or camera (or video camera) 204 conveys signals to the tamper resistant cipher facilities that combine the replacement data into the one or more static images read from memory and/or captured by the camera and/or real-time image frames that are conveyed by video cameras. Portions of the replacement image data replace and/or transpose portions of the original image data until the entire replacement image is overlaid, imbedded, appended and/or integrated within the static image or contained by some or all of each video frame or image conveyed by the camera 204. In some processes, the replacement image is positioned within a vector compressed/conveyed within a single pixel by replacing the original pixel value; in some processes it replaces multiple pixels by replacing multiple pixel values; and in some systems it combines pixel(s) (e.g., combining some of the pixel values that render the captured (original) image(s) with the pixel values that render the replacement image(s)). In some systems, the replacement image is positioned within a vector conveyed by a strip or a linear segment overlaid across one or more static images or video frames, and in some processes the modified pixel(s) rendered by pixel values are randomly positioned based on a pseudo-random-sequence generator or a sequence, generated by the pseudo-random-sequence generator. In other systems the pixels are placed by the sequences described herein.

Each of the pixels that represent a captured image, replacement image, and/or a modified image can be represented by a pixel value which describes how bright that pixel is, and/or what color it will be. Separate red, green and blue components are specified for each pixel in a red green blue color space making the pixel value also a vector of at least four or more numbers. In some systems, the vectors are designated by separate color planes, which are recombined when further processed or the modified image is rendered.

The original images and/or video frames do not appreciably change with the modification as current graphic standards include more color graduations and permutations than the human eye can detect and cryptoanalysis monitor. In some processes, the modifications made by combining portions of the one or more replacement images with portions of the original images and/or video frames until the entire replacement image(s) are subsumed within or appended to the original images and video frames are tracked so that the statistical profile of the modified image and/or modified (real-time) video frames of the byte sequence and/or byte strings are substantially the same as or identical to the original captured image and/or unmodified frames of video. At 710, the tamper resistant cipher facilities make a network selection (and instructs the transceiver) to transmit the modified images/video frames across a network such as private dedicated to video streaming. In some processes the modified images/video frames are stored in a cloud storage. The term cloud storage is intended to broadly encompass hardware and software that enables images or the data that renders them to be maintained, managed, and backed up remotely and made available to users over a publicly accessible or private network. In this system, cloud storage provides ubiquitous access to the system's resources including monitor detections, encryptions, tracking (by monitoring changes) and higher-level services that can be rapidly provisioned by a network access. Cloud storage allows for the sharing of resources to achieve coherence services across many monitored systems at many locations and provides economies of scale.

Figure 8:
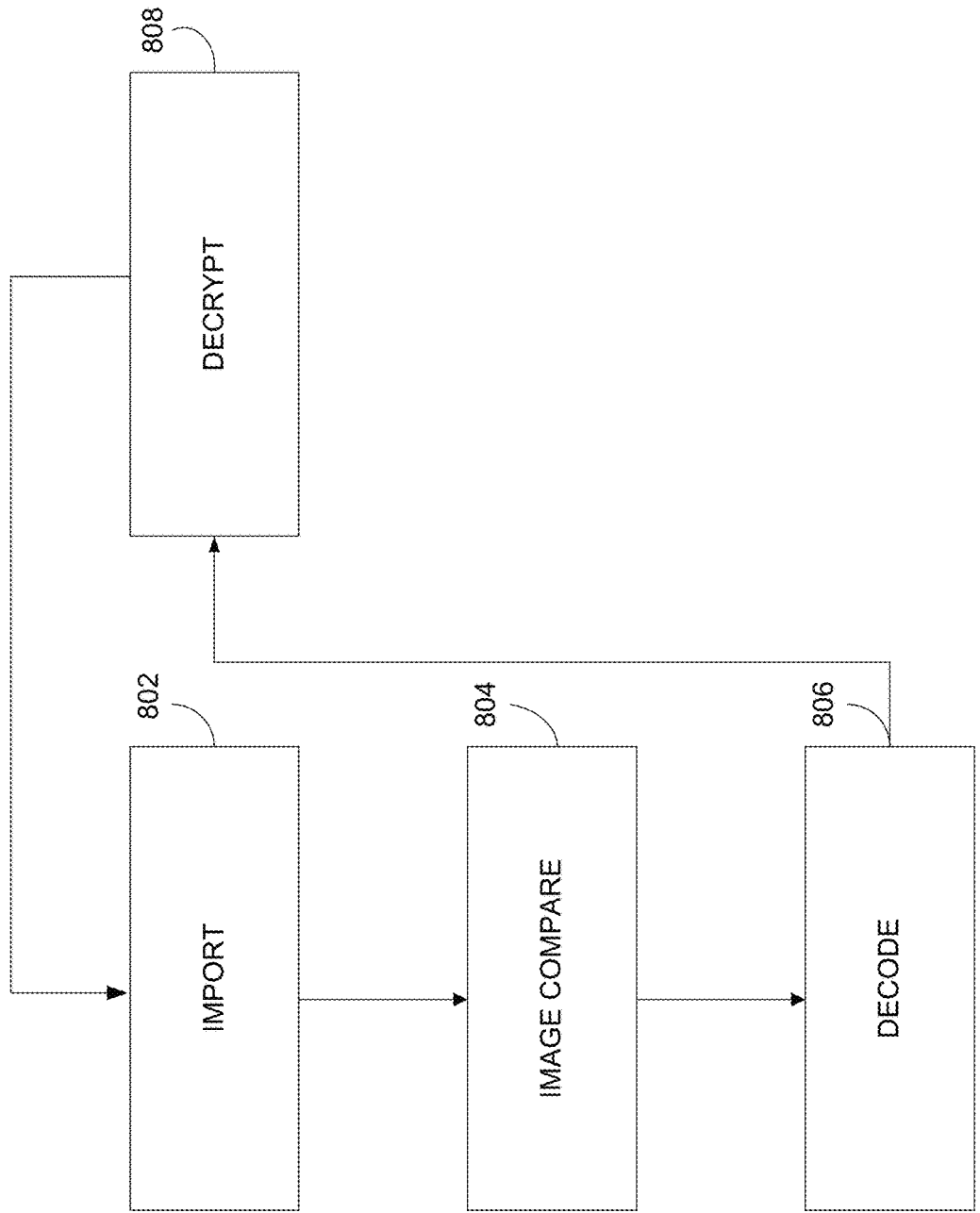
FIG. 8 is an exemplary process flow of a synesthesia-based deciphering process.

At the destination node or site, the replacement image is identified and decrypted. In some system, the receive side processes a message (also referred to as a heads-up message) that includes information used to extracts messages from the modified images. When two levels of encryption are used (e.g., an initial encryption and the image concealment), a reversing process is executed. The reversing process may import an unmodified version of the image or video frames and calculates the pixel information at 802 in FIG. 8. The modified version is compared to the unmodified version to identify and extract the replacement image and/or replacement video frames to render a hidden data file at 804. Applying a reverse analysis, the process applies reverse comparison to the hidden data file using the color palette or reverse color map that concealed it to extract the corresponding characters that form the enciphered text. The reverse color-map corresponds colors to characters. In the reverse analysis, a character is substituted for each block of color extracted from the modified image at 806. The enciphered text is then decrypted into plaintext or other objects based on the encryption key (and control vectors if used) to decipher the monitored input (or a corresponding or different decryption key) to render the original input, which is then repeated for the next image or frame at 808. If the alternate system's tripart encryption is used, the enciphered text is first decrypted into an output using the key based on the block size output and network that transmitted the message to the destination before that encoded output is deciphered using the reverse color map. The deciphered output is further deciphered with the corresponding key used to first encipher the input to render the original input. In some systems, the replacement image is used primarily for obfuscation and the reverse analysis process is bypassed by recovering and deciphering the message directly from hidden metadata fields within the image file.

Figure 9A:
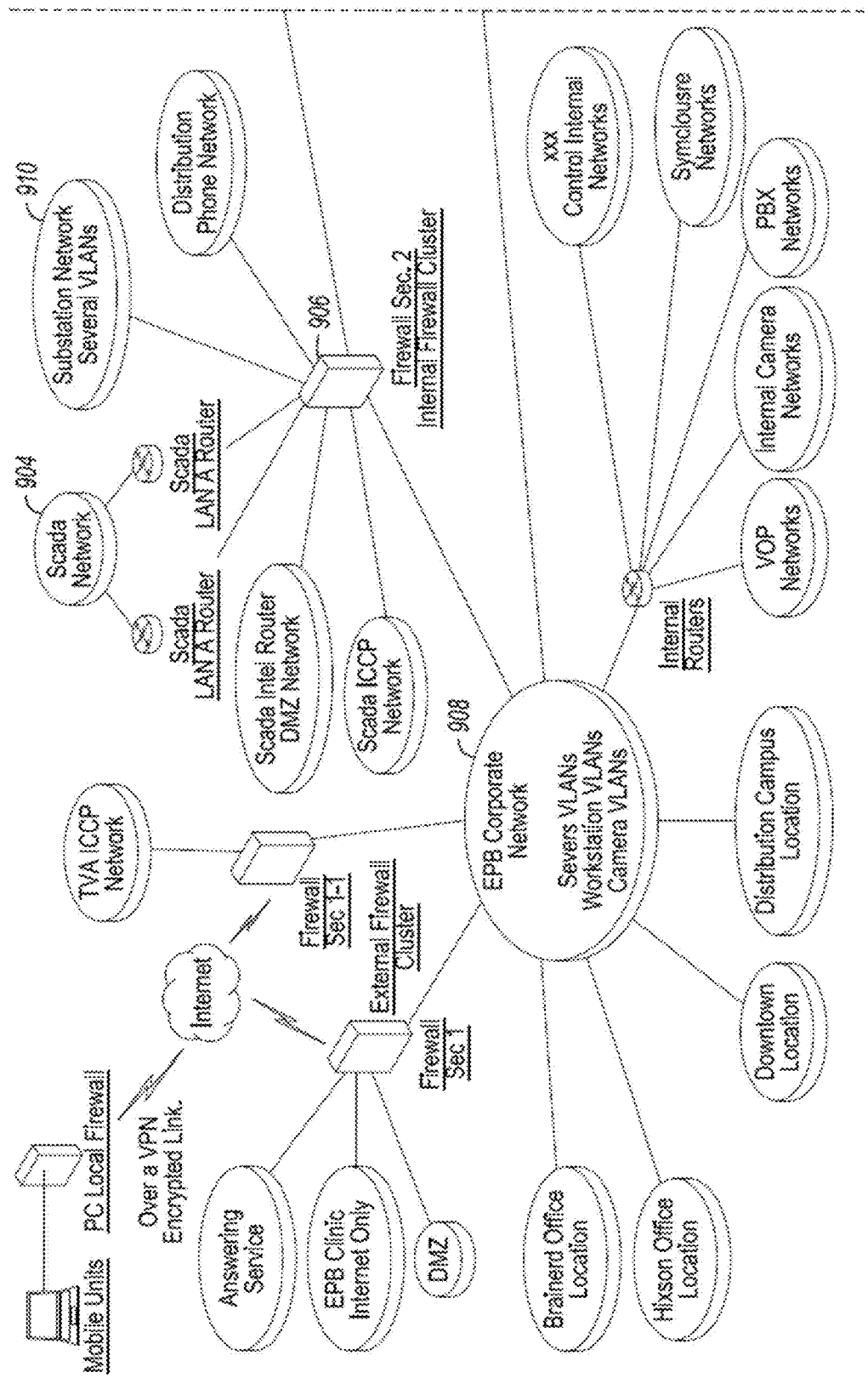
FIGS. 9A and 9B (referred to as FIG. 9) shown an exemplary electric utility computer architecture.
Figure 9B:
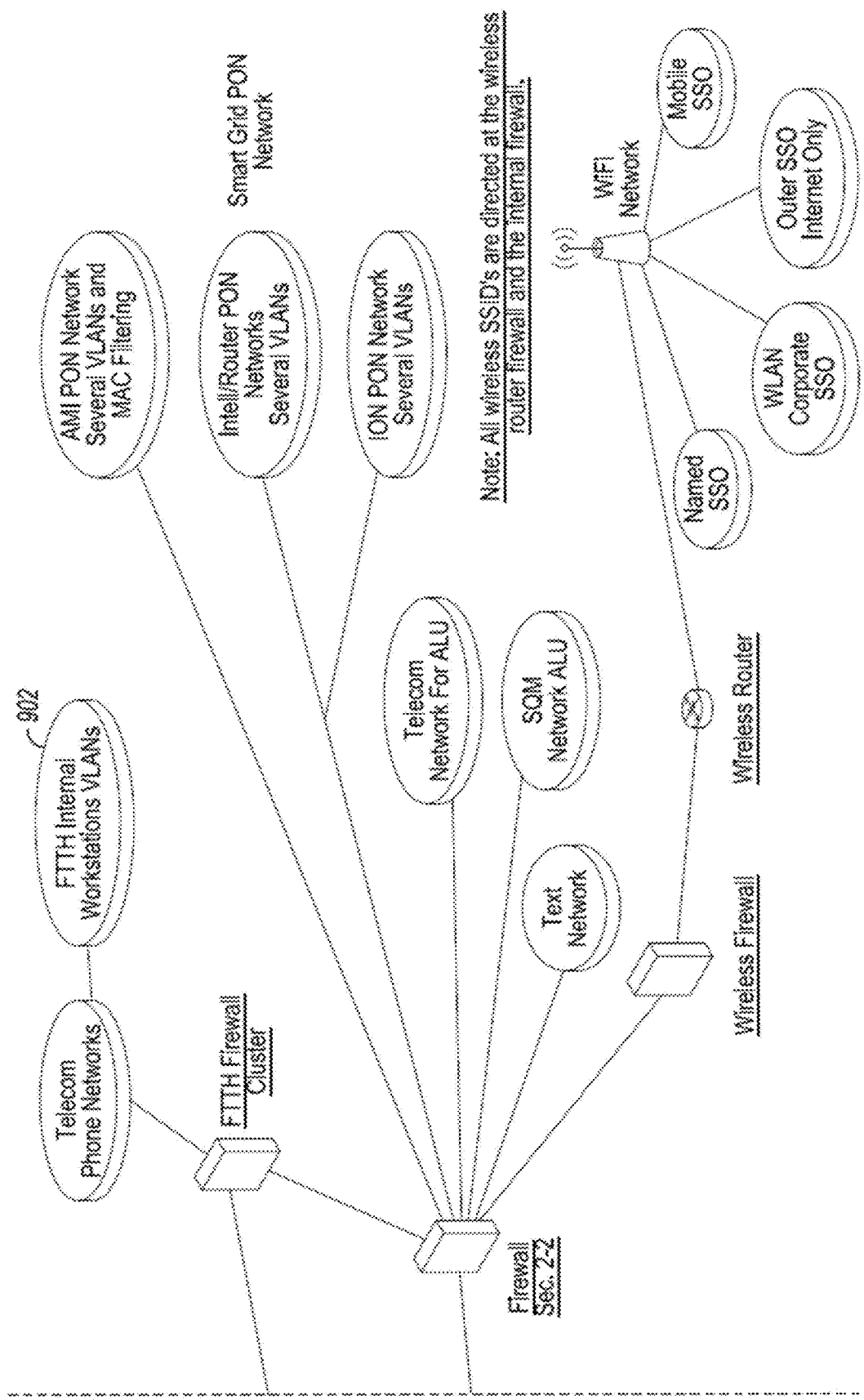

In the exemplary utility architecture of FIG. 9, a fiber to the business (FTTB) 902 uses one optical fiber network to bear multiple services, such as providing high speed Internet, Wi-Fi, voice, video to utility connected services, it removes bottlenecks between the utility services and the central server local area networks, workstation local area networks, and camera local area networks. A supervisory control and data acquisition (SCADA) network 904 installed within the utility (ITU) includes the network infrastructure installed within a utility control center that includes optical fiber cabling, twisted pair cabling, file allocation tables (FAT), and other infrastructure which carries internal network services. The SCADA network 904 outside the firewall 906 of the corporate network 908 also includes the central software and hardware elements that allows the utility to control power generation and/or power distribution locally and/or at remote substation locations. It also facilitates the monitoring, gathering, and processing of real-time data generated through the sensors, transducers, other monitors, valves, pumps, motors, and cameras. The SCADA network 904 is accessible through human-machine interface (HMI) and records system wide events within a local log file making it an attractive target for cryptanalysts. The substation network 910 refers to the network infrastructure installed within or near the many remote utility substations. The substation network 910 includes optical fiber cabling (e.g., see 206 of FIG. 2) that supports balanced cabling, network media, substation resources, and interfaces remote substation sensors, transducers, valves, pumps, motors, cameras. Network resources record substation events and data transactions within or local to a remote substation in a substation log file. In FIG. 9, the synesthesia-based encryption systems keeps some of the monitored data and messages off of the SCADA network 904. Instead, the monitored data and messages are enciphered on a separate distributed network not usually monitored by eavesdroppers. In the exemplary utility flow diagram of FIG. 9, it transmitted through a dedicated video feed-only network (also referred to as a camera network) that is shown under the corporate network reference 908. By using multiple networks some of which convey data and messages at a granular (e.g., sensor/transducer/other monitor) level, and hides that information in plain sight in a dedicated network, the synesthesia-based encryption systems offer a higher degree of security. Since the cost required to break the disclosed algorithms at each sensor, transducer, etc. (monitor) is likely much greater than the transactional value of the data alone, the system is safer than centrally driven solutions.

Figure 10:
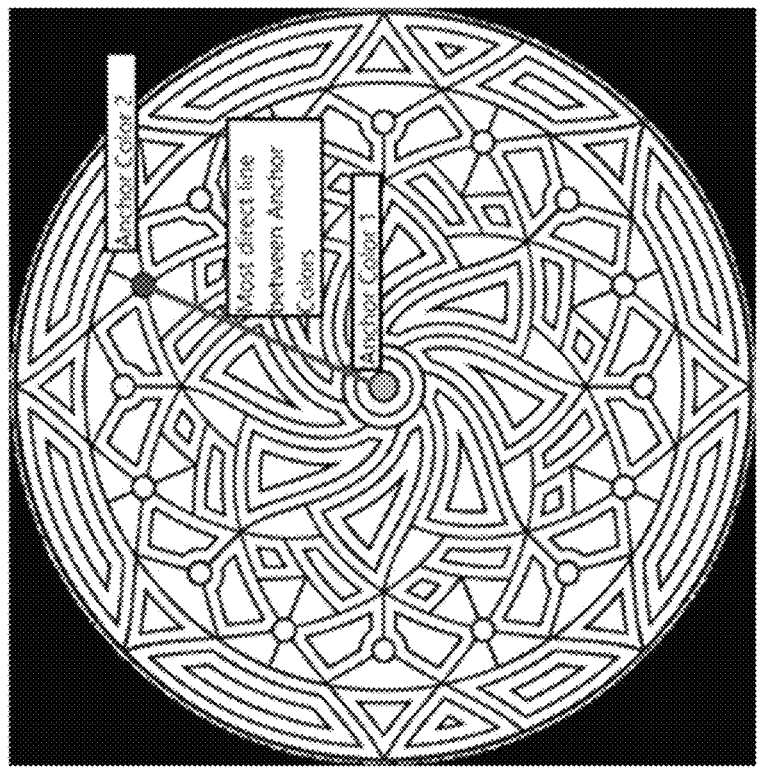
FIG. 10 is an exemplary spherical image showing anchors of a replacement image.
Figure 11:
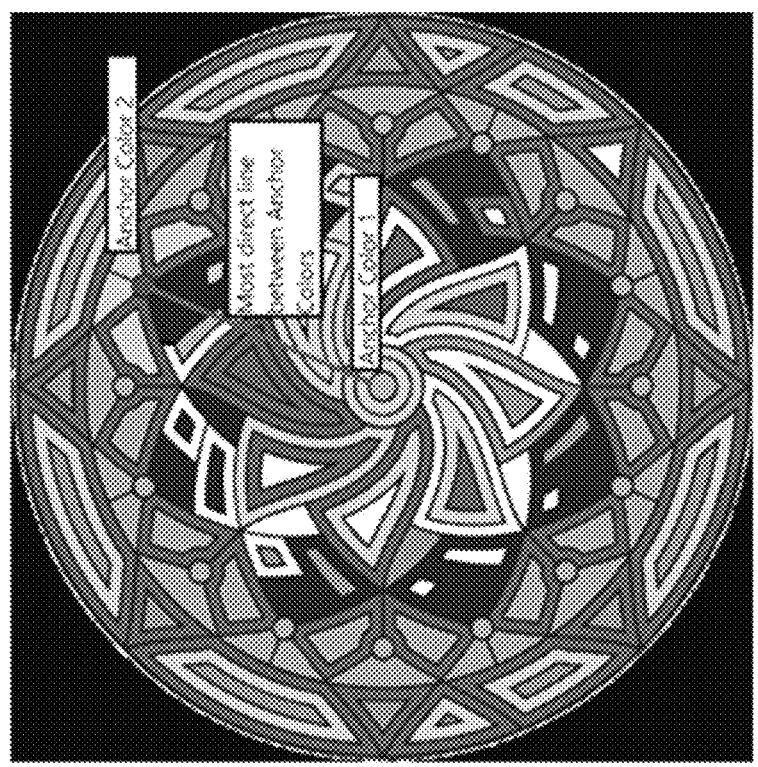
FIG. 11 is the exemplary spherical image disguising the replacement image and the anchors.

FIGS. 10 and 11 show a placement of the replacement image between endpoints of a vector on a spherical image. The endpoints are randomly positioned based on a pseudo-random-sequence sequence generated by the pseudo-random-sequence generator. The disguise applies decoy colors which are similar to the anchor colors, but not identical, to allow for the visual assimilation of the anchors. Additional color graduations may also be used to further disguise the anchors. While the magnification of FIGS. 10 and 11 is high to illustrate this exemplary solution, resolutions can be reduced making it less detectable to the human eyesight. Additionally, anchor colors may be randomly generated and rotated based on the pseudo-random-sequence generator and/or other numerical sequences. Further, alternate vector(s) may comprise one or more spiral vectors (or substantially spiral-like vectors), cardioid vectors (or a substantially cardioid-like vectors), catenary vectors (or substantially catenary-like vectors), linear vectors (or substantially linear vectors) rendered in one, two, three, or four dimensions that enclose a color string between endpoints. The term color string refers to a data structure representing a sequence of colors representing an enciphered vision-identifiable image.

Figure 12:
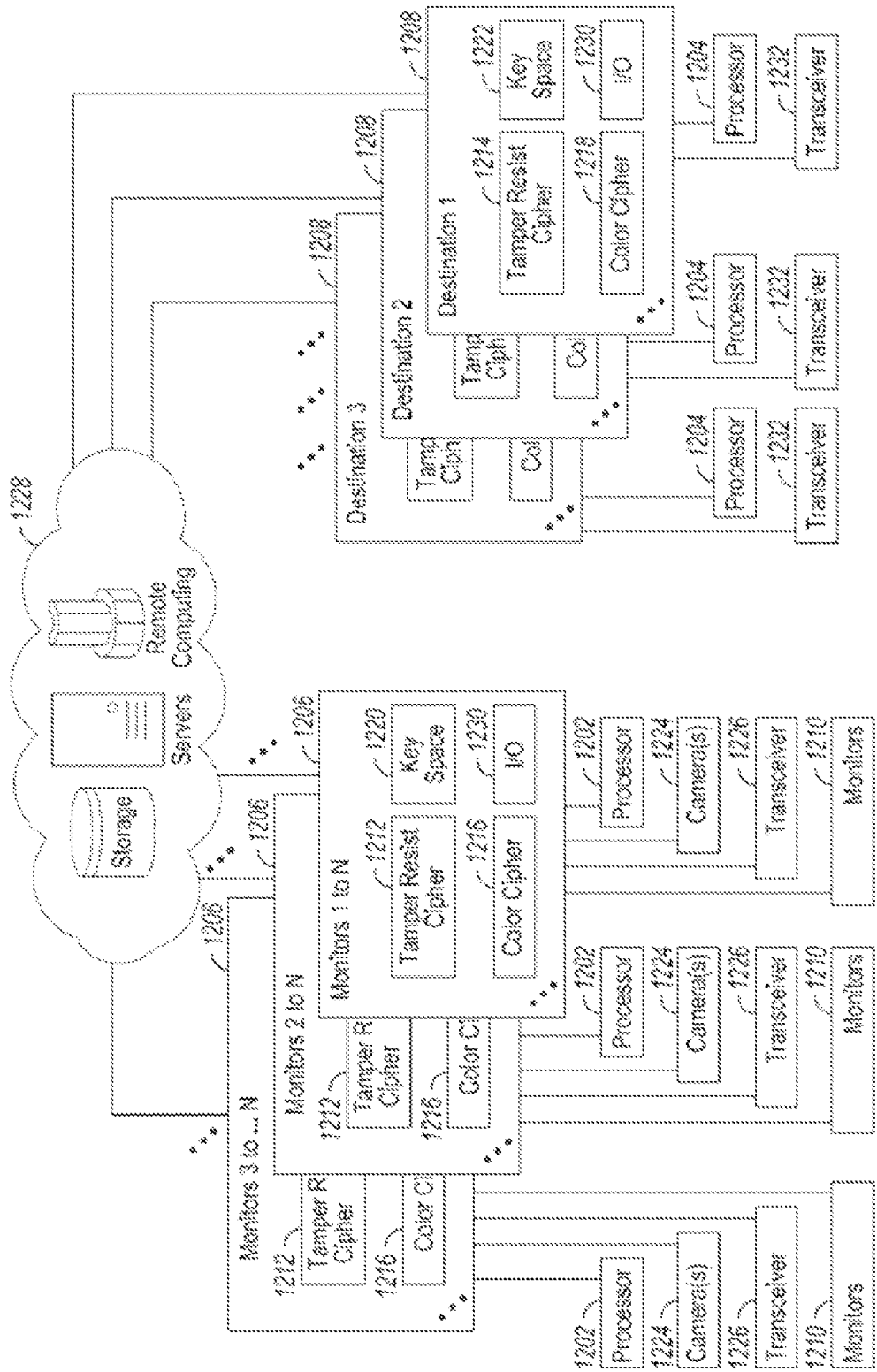
FIG. 12 is an exemplary synesthesia-based encryption system.
Figure 13:
FIG. 13 are exemplary modified/combined real-time video frames.

FIG. 12 is a block diagram of an alternative synesthesia-based encryption system that may execute the process flows, functions, and execute the systems described herein and those shown in FIGS. 1-11 and renders the images shown in FIGS. 13 and 14. The system comprises multiple processor units or graphical processor unit 1202 and 1204, a non-transitory media such as a memory 1206 and 1208 (the contents of which are accessible by the one or more processors and/or graphical processors 1202 and 1204), a public and/or private network, monitors 1210, tamper resistant ciphers 1212 and 1214, color ciphers 1216 and 1218, key spaces 1220 and 1222 (e.g., storing a range of keys K), cameras 1224, transceivers 1226 and 1232, a cloud 1228 and I/O interfaces 1230. The I/O interfaces 1030 connect devices and local and/or remote applications such as, for example, additional local and/or remote monitored cameras 1224 and wireless drones. The memory 1206 and 1208 stores instructions, which when executed by the processors 1202 and 1204, causes the system to automatically render functionality and hardware that enables the static and dynamic security.

The memory 1206 and 1208 and/or storage disclosed may retain an ordered listing of executable instructions for implementing the functions described above in a computer code or non-transitory machine readable medium. The machine-readable medium may selectively be, but not limited to, an electronic, a magnetic, an optical, an electromagnetic, an infrared, or a semiconductor medium. A non-exhaustive list of examples of a machine-readable medium includes: a portable magnetic or optical disk, a volatile memory, such as a Random-Access Memory (RAM), a Read-Only Memory (ROM), an Erasable Programmable Read-Only Memory (EPROM or Flash memory), SSD, or a database management system. The memory 1206 and 1208 may comprise a single device or multiple devices that may be disposed in one or more dedicated memory devices or disposed in a processor or other similar device. The term "coupled" disclosed in this description encompasses both direct and indirect coupling. Thus, first and second transceivers are said to be communicatively coupled together when they directly communicate with one another, as well as when a first transceiver communicates to an intermediate transceiver which communicates either directly or via one or more additional communicative components to the second transceiver. The term "engine" is intended to broadly encompass a processor or a portion of a program that executes or supports events such as the enciphering and/or deciphering processes. When functions, steps, etc. are "responsive to" or occur "in response to" another function or step, etc., the functions or steps necessarily occur as a result of another function or step, etc. A device that is responsive to another requires more than an action (i.e., the device's response to) merely follow another action. The term "substantially" or "about" encompasses a range that is largely, but not necessarily wholly, that which is specified. It encompasses all but a significant amount, such as within five percent. In other words, the terms "substantially" or "about" means equal to or at or within five percent.

Alternate systems are not limited to the particular hardware and algorithms described above. Other suitable hardware and algorithms can be used. Furthermore, the systems are not limited to providing security for an electric utility. Rather, the systems can provide security to automated systems across local and distributed networks. The systems illustratively disclosed herein suitably may be practiced in the absence of any element (including hardware and/or software), and in the absence of some or all of the described functions association with a process step or component or structure that are expressly described. The systems may operate in the absence one or more of those process steps, elements and/or any subset of the expressed functions. Further, the various elements described in each of the many systems described herein is regarded as divisible with regard to the individual elements described, rather than inseparable as a whole. In other words, alternate systems encompass any variation and combinations of elements, components, and process steps described herein and may be made, used, or executed without the various elements described (e.g., they may operate in the absence of).

A synesthesia-based encryption system and process provides nearly risk-free communication, data security, and file security. By automating the generation, distribution, storage, and channeling of messages, and dynamically changing the schemes that conceal messages, the protocol provides secure monitor-to-monitor, monitor-to-terminal, and monitor-to-server communication, secure storage, and secure communications between transmitters and receivers. Each monitor communicates on a network includes a tamper resistant cipher that executes dynamic encryption and/or a color cipher that executes a dynamic concealment that changes with each message transfer and/or at each synchronized transmitting time period. Besides dynamically encoding messages to prevent unauthorized access, the systems dynamically hide the encrypted messages in other media through a dynamic concealing process. The constantly mutating and changing processes make cryptanalysis impractical and the system computationally secure.

The systems limit exposure to cryptographic attacks. The concealing process hides the secret data in other media, such that the data's very existence is hidden. In use, a device detects or measures somethings. In some systems, the enciphered signals hide secrets through a translation into graphic image data stored in a graphic image file that renders a replacement image such as bitmapped graphic replacement image. The bitmapped graphic replacement image(s) replace graphics interchange formats and the standard video formats conveyed by video cameras. Some systems obfuscate secrets by placing replacement image within a visible yet obscure vector that is part of the modified image having anchor points.

The systems combine one or more replacement image(s) that represents a secret measurement(s) or secret detection(s) of something into one or more static images and/or one or more video frames generated by and conveyed by camera or a video camera as shown in FIGS. 13 and 14 (highly magnified and expanded across many pixels to illustrate the exemplary solution). In FIG. 13, the one or more replacement image(s) are positioned near an upper portion and a substantially middle position of the video frames. Reference arrows call out the exemplary replacement images in FIG. 14 and exemplary replacement portions in the video frames in FIG. 13. As shown, one or more replacement images may be integrated intone or more original images and/or video frames in any coordinate orientation (e.g., a vertical and horizontal image orientation is shown in FIG. 14). The systems combine image data that can be converted into a replacement image into the one or more images and/or real-time images that comprise video frames.

Other systems, methods, features and advantages will be, or will become, apparent to one with skill in the art upon examination of the figures and detailed description. It is intended that all such additional systems, methods, features and advantages be included within this description, be within the scope of the disclosure, and be protected by the following claims.

The invention claimed is:

1. An apparatus operated at a utility substation that is remote from a central station, the apparatus comprising:
   a camera configured to capture an image at a substation;
   a transceiver communicatively coupled to a destination over a video feed network;
   a sensor configured to:
      sense a physical property at the substation, and
      output a sensor message that includes characters indicative of the physical property; and
   a hardware processor configured to:
      map a plurality of colors from a color palette to characters from the sensor message to form a replacement image from a plurality of mapped colors,
      integrate the replacement image within the image captured by the camera to form a combined image, and
      cause the transceiver to transmit the combined image to the central station over the video feed network.

2. The apparatus of claim 1, where the hardware processor is configured to append the replacement image over the image captured by the camera at an anchor location to render the combined image.

3. The apparatus of claim 1, wherein the replacement image comprises a color string defined by a vector.

4. The apparatus of claim 3, wherein the vector is positioned between corresponding vertices of an offset cube.

5. The apparatus of claim 1, wherein the hardware processor is configured to
overlay the replacement image over a plurality of images captured sequentially by the camera to form a sequence of combined images in real-time, and
instruct the transceiver to transmit the sequence of combined images.

6. The apparatus of claim 1, where
the sensor is configured to output two or more sensor messages, and
the hardware processor is configured to
form a plurality of corresponding replacement images from the sensor messages through a color cipher processing the color palette,
overlay the plurality of corresponding replacement images over a plurality of different images captured by the camera to render a plurality of combined images, and
cause the transceiver to transmit the plurality of combined images.

7. The apparatus of claim 6, where the hardware processor is configured to overlay the plurality of corresponding replacement images over the plurality of different images captured by the camera at different anchor locations in the plurality of combined images.

8. The apparatus of claim 6, where the hardware processor is configured to overlay the plurality of corresponding replacement images across the different captured images at anchor locations using different replacement-image orientations.

9. The apparatus of claim 1, where
the sensor is configured to output two or more sensor messages, and
the hardware processor is configured to
form a plurality of replacement images from the sensor messages by processing the color palette through a color cipher, and
overlay the plurality of replacement images over a static image captured by the camera to form the combined image.

10. The apparatus of claim 9, where the hardware processor is configured to overlay the plurality of replacement images over the captured image using a plurality of coordinate orientations.

11. The apparatus of claim 9, where the hardware processor is configured to integrate the plurality of replacement images over the captured image by replacing a least significant bit of each byte of a data structure that comprises the plurality of replacement images.

12. The apparatus of claim 11, where the hardware processor is configured to integrate the plurality of replacement images over the captured image by replacing a least significant bit of each byte of a data structure that comprises the plurality of replacement image.

13. The apparatus of claim 12, where the hardware processor is configured to compensate for the replacing of the least significant bit by modifying of other lesser significant bits of the data structure to render a substantially identical statistical profile of the plurality of replacement images.

14. The apparatus of claim 1, where an integration of the replacement image is rendered by the hardware processor by combining a plurality of pixel values of the captured image with pixel values of the replacement image.

15. The apparatus of claim 1, where an integration of the replacement image comprises overlaying the replacement image over the image captured by the camera by a replacement of pixel values.

16. The apparatus of claim 1, where the hardware processor is configured to:
extract a representation of the sensor message from the combined image, and
map the plurality of colors from the color palette to the representation of the sensor message.

17. The apparatus of claim 1, where the utility substation is configured to communicate across a supervisory control and a data acquisition architecture.

18. The apparatus of claim 1, further comprising:
a second transceiver communicatively coupled with the transceiver across the video feed network to receive the combined image; and
a second processor configured to, for each received combined image,
extract the replacement image from the combined image,
execute reverse comparison using the color palette to extract the characters that form a ciphered text; and
decrypt the ciphered text based on a decryption key.

19. The apparatus of claim 18, where the second processor extracts the replacement image using a key based on a block size generated by a color cipher and a selection of the video feed network.

20. The apparatus of claim 1, where the replacement image is embedded in a vector designated by the hardware processor.

* * * * *